United States Patent [19]

Hope

[11] Patent Number: 4,912,977
[45] Date of Patent: Apr. 3, 1990

[54] DEVICE FOR POSITION DETERMINATION OF TRANSITION ZONES BETWEEN AT LEAST TWO DIFFERENT ENCLOSING MEDIA

[76] Inventor: Bjorn R. Hope, Kampenveien 20, N-1350 Lommedalen, Norway

[21] Appl. No.: 313,135
[22] PCT Filed: Jun. 8, 1988
[86] PCT No.: PCT/NO88/00051
   § 371 Date: Feb. 6, 1989
   § 102(e) Date: Feb. 6, 1989
[87] PCT Pub. No.: WO88/09918
   PCT Pub. Date: Dec. 15, 1988

[30] Foreign Application Priority Data

Jun. 9, 1987 [NO] Norway ................................. 872400

[51] Int. Cl.⁴ ........................ G01F 23/22; G01P 5/10; G01P 13/00
[52] U.S. Cl. ................................. 73/295; 73/304 R; 73/292; 374/142
[58] Field of Search ........................... 73/295; 374/292

[56] References Cited

U.S. PATENT DOCUMENTS

| | | |
|---|---|---|
| 1,833,112 | 11/1931 | Harrison . |
| 2,702,476 | 2/1955 | De Boisblanc . |
| 2,981,104 | 4/1961 | Auger et al. . |
| 3,181,557 | 5/1965 | Lannan, Jr. ............................ 73/295 |
| 3,280,627 | 10/1966 | Cousins et al. . |
| 3,797,310 | 3/1974 | Babcock et al. ...................... 73/295 |
| 4,287,756 | 9/1981 | Gallagher ..................... 73/290 R X |
| 4,320,656 | 3/1982 | Tiskus .................................. 73/295 |
| 4,423,629 | 1/1984 | Ara et al. . |

Primary Examiner—Daniel M. Yasich
Attorney, Agent, or Firm—Cushman, Darby & Cushman

[57] ABSTRACT

A measuring device for determination of the distribution and position of different material compositions, preferably liquids and gases, with the aid of the thermodynamic properties of the material. Through the arrangement of sensor elements as sectors on the inside of a hollow body, it is possible to record the flow direction of the medium being measured at different levels.

47 Claims, 6 Drawing Sheets

DEVICE FOR POSITION DETERMINATION OF TRANSITION ZONES BETWEEN AT LEAST TWO DIFFERENT ENCLOSING MEDIA

BACKGROUND OF THE INVENTION

The invention concerns a measuring and recording system for determination of the distribution and position of media which enclose the device, chiefly in its longitudinal axis. It is based on thermodynamic properties of the media, such as thermal conductivity and capacity.

More specifically, the invention concerns a measuring device arranged for determination of the vertical distribution of one or more media which have a thermal connection with the device and where the positions of the interfaces can be determined on the basis of differences in thermal states and properties, comprising an arrangement of one or more thermal conductor elements which have a common thermal reference element and discrete, chiefly thermally insulated sensor areas which, again, have good thermal contact with the medium, being measured through a common partition wall which affords sufficient physical and thermal separation, as well as means for keeping the reference element at a temperature level different from the medium being measured.

In the process industry, especially in the petrochemical industry, it is necessary to be able to record the distribution, position, and thermodynamic state in a process to be able to monitor and control it. The problem of recording the above essentially consists in the fact that the medium is under high pressure and high temperature and also has a consistency which makes it difficult to record transition zones between the individual fractions. In many cases, deposits and various types of choking are problems which make many known principles unsuitable. In addition, the environment inside and outside the process may frequently be of a highly explosive nature. There are many solutions aimed at the recording of distributions and positions of different media based on acoustic, capacitive, and resistive principles. Various types of specific gravity determination also underlie the recording of layers and transition zones in a complex medium being measured. Owing to the foregoing problem presentation, the noted principles are unsuitable on various grounds for the recording of transition zones in special process types.

There are also various sensor systems based on the difference in the thermal conductivity in liquids. For example, mention may be made of Norwegian Patent No. 133517 where, with the aid of an extended thermocouple, a temperature differential is recorded on the inside of a pipe where the warm side of the element also has a thermal connection to an electric heating element. The temperature differential over a given distance in the longitudinal direction of the pipe and the liquid around it is determinative for the signal level.

Among other systems used for measurement of liquid levels, mention may be made of British Patent Application GB-A 2.134.260, U.S. Pat. No. 2,702,476, U.S. Pat. No. 3,280,627, and German Patent (Offenlegungsschrift) 1.959.041. A feature common to all these patents is that it is not possible to record minor changes in thermal properties with sufficiently high resolution.

SUMMARY OF THE INVENTION

According to the invention, a measuring device with high resolution is achieved, being able to distinguish with good contrast between minor variations in the thermal properties of the surrounding medium being measured. This can, in principle, be achieved without the supply of electrical energy, which is of major importance for application in explosive environments. The measuring device is based on the different thermodynamic properties of the material. Through appropriate composition of components and materials with regard to thermal conduction and capacity, the required measuring effect is achieved. Any change in the signal response of the sensor is an expression of the medium which surrounds it.

The measuring device noted in the introduction is characterized according to the invention in that, on the noted thermal conductor elements along the outer part and inner part respectively, temperature sensor elements are alternately arranged, being electrically connected in series for measurement of the thermal transport between the common thermal reference element and the sensor areas with regard to magnitude and direction, and in that a signal processor converts the measurement signals thus produced into an indication of the position and any change in the thermodynamic properties of the medium.

The sensor device is chiefly built around an extended and good heat conductor which, on the basis of material selection and design, preferably as a hollow body, keeps the temperature constant over its full extent and thereby forms a thermal reference element from which chiefly conductor elements extend to form a thermal connection between the reference element and a boundary to the medium being measured. The boundary is preferably designed as a thin-walled sheet-like device from a material with large thermal resistance. Through recording of the temperature differential on the individual conductor elements, an expression of heat transport arises one way or another between the reference element and boundary to the medium being measured. Owing to poor heat conduction properties in the noted sheet, local thermally mutually isolated contact surfaces are obtained.

The reference element functions as a temperature converter through which liquid or gas flows for establishment of a reference temperature. The system chiefly operates according to two principles, i.e.:

I. The reference temperature is kept at a constant level which, in principle, may be higher or lower in relation to the medium being measured. It may also be appropriate that the reference temperature should be equal to one of the components in a complex medium being measured, e.g. that the gas in a process tank should flow through the reference element.

II. The composition of the medium being measured with regard for thermal capacity is codeterminative in the time constant which can be recorded at an abrupt change in the reference temperature. This is possible during alternate change of the through-flowing medium which has different temperature levels.

At the abrupt change in the temperature of the through-flowing medium, the temperature differential on the individual conductor elements is recorded. The temperature differential changes according to an exponential function where the time constant consists of a complex value of fixed and variable temperature conductors and capacities where the fixed ones are represented by the device and the variable ones by the medium being measured.

A practical embodiment of the device without this being a restriction is e.g. a coaxial structure where the reference element consists of a centrally arranged solid pipe of a material with good thermal conductivity.

An outer thin-walled pipe of a material with poor thermal conductivity is thermally connected to the inner one with the aid of conductor elements which chiefly have a concentric extent between the inner and outer pipes, designed as larger or smaller sectors. These, again, have a distribution in the longitudinal direction of the pipes corresponding to the resolution required for the system.

Temperature sensors are arranged near the contact points of the elements with the inner and outer pipes respectively. These are preferably designed as differential temperature sensors in the form of a thermopile.

The invention is further described hereinbelow with reference to the attached drawings in which embodiments are illustrated.

DETAILED DESCRIPTION

Figure 1:
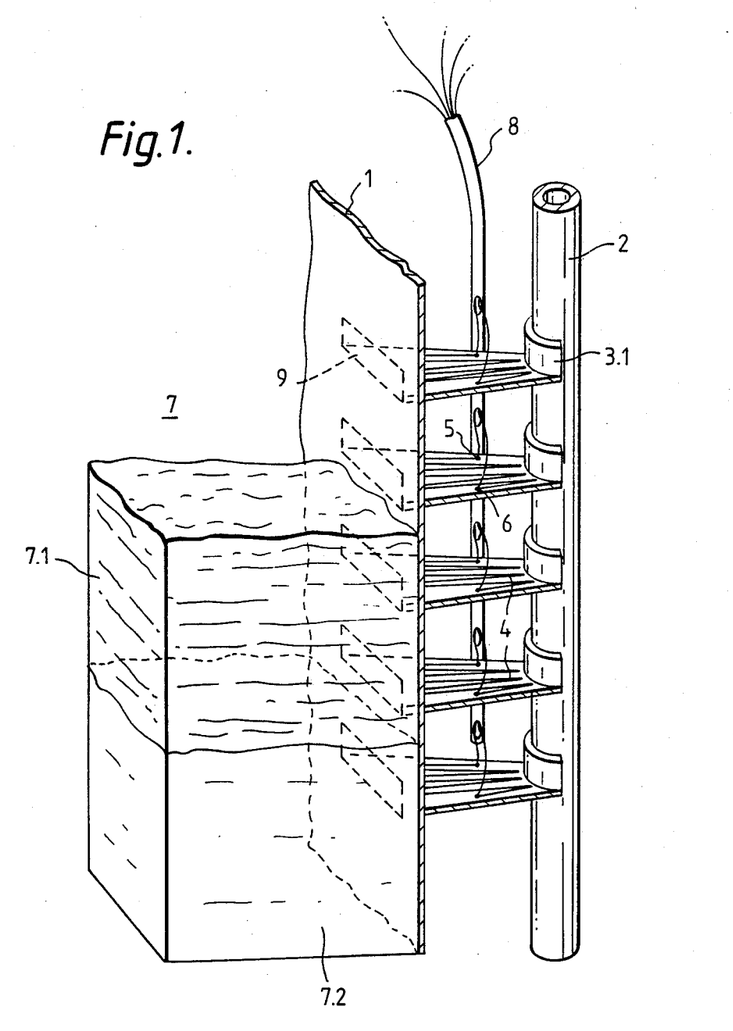
FIG. 1 shows an embodiment of a device integrated in part of the tank.

FIG. 1 shows a simple embodiment where the sensor part is separated from the medium being measured by partition wall 1 which may advantageously be part of a tank. Tubular thermal reference element 2 made of a good thermally conductive material, such as copper, has a good thermal connection through conductor elements 3 with discrete sensor areas 9 on partition wall 1 which, owing to poor thermodynamic heat conduction properties, largely prevents temperature equalization along the surface between the contact points, and sensor areas 9 may thus be regarded as being thermally transparent. Individual thermally insulated contact surfaces are thereby established with media being measured 7, 7.1, and 7.2.

Reference element 2 may be advantageously arranged as an extended hollow, tubular body. This facilitates changes in the temperature of the reference element, e.g. when liquid or gas is flowing through. An appropriate design of the reference element can be arranged with the aid of known technology so that the through-flowing thermal medium has a distribution of flow on the inside the the reference element for minimization of the temperature gradient in the longitudinal direction of the reference element as a result of thermal conduction. It may also be appropriate to arrange thermal sensors for recording of temperature gradients along the extent of the reference element. It is thereby possible to monitor the thermal transport between reference element 2 and medium being measured 7 via conductor elements 3. The amount and direction of the thermal transport is recorded with the aid of the temperature differential on contact points 3.1 of the conductor elements with reference point 9.1 and with partition wall 1. This is advantageously recorded via differential temperature sensor element 4 which is advantageously designed as a thermopile of a plurality of series-connected thermocouples appropriately determined on the conductor element.

Termination points 5 and 6 of the temperature sensor element are run together in cable 8 towards a signal processor.

Figure 2:
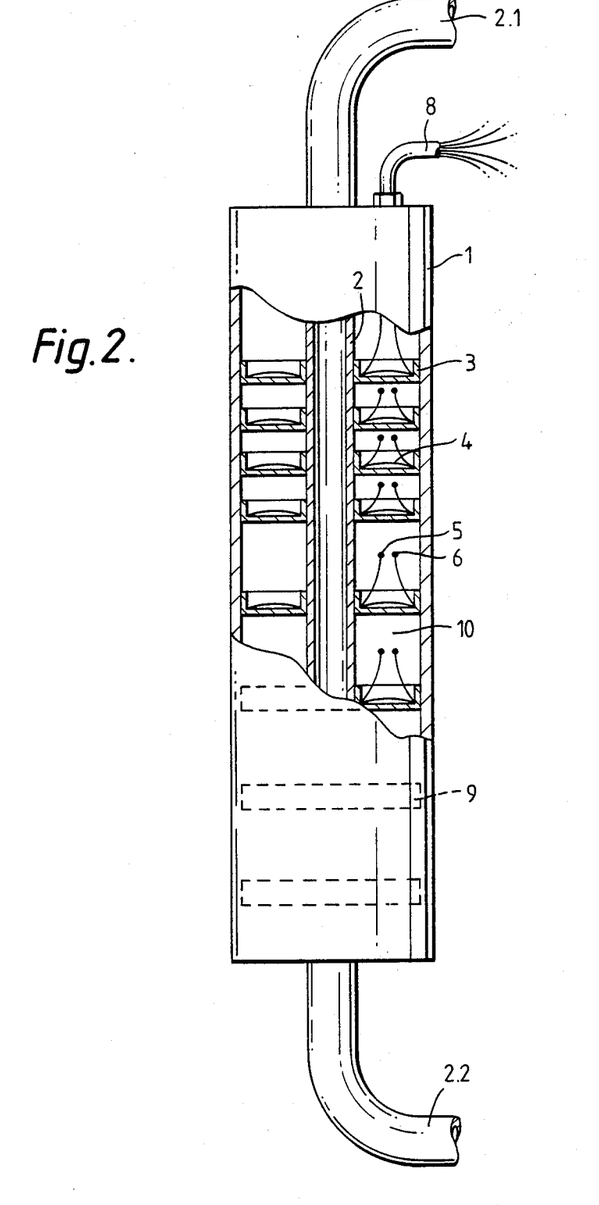
FIG. 2 shows an appropriate embodiment in the form of a completely enclosed sensor unit, and FIG. 2a an industrial modification of the same.
Figure 2A:
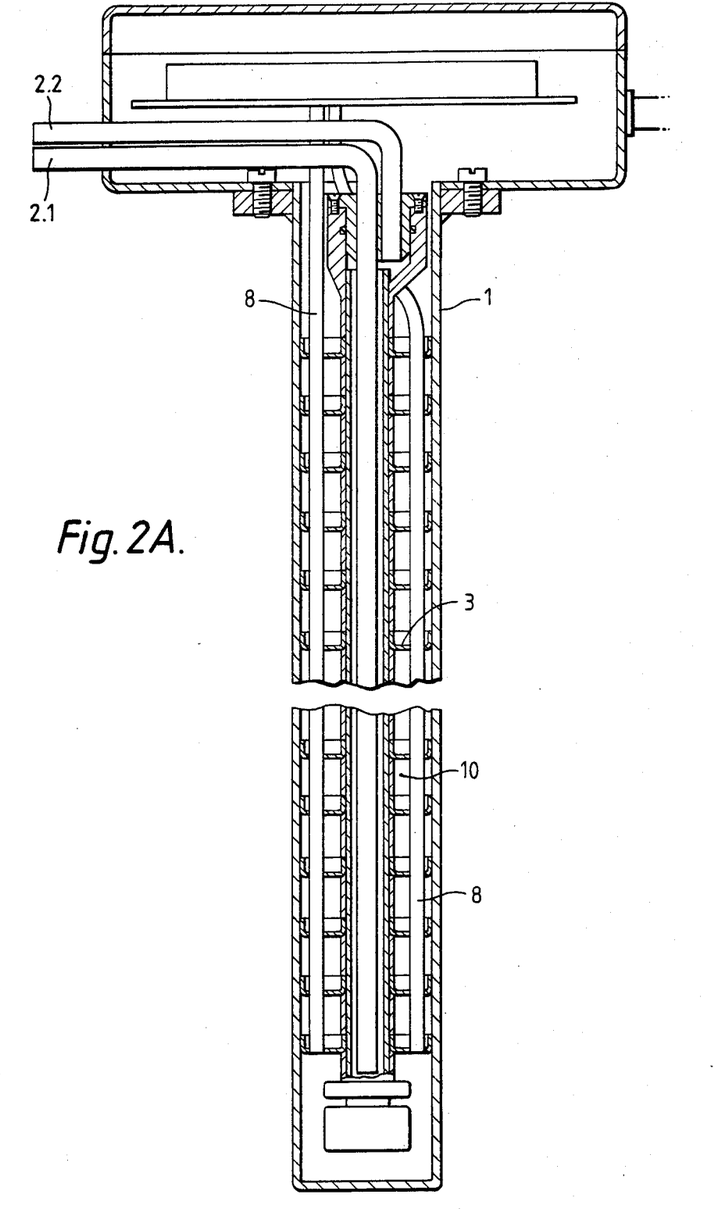

FIG. 2 shows the sensor designed as a coaxial structure with reference element 2 in the form of a hollow element with good thermal conductivity, e.g. made of copper, and outer enclosing partition wall 1 of a material with with extremely poor heat conduction properties, e.g. a thin-walled acid-resistant steel sheet.

The thermal connection between reference element 2 and external partition wall 1 is preferably made with the aid of circular heat conductors 3. In order to achieve special measuring effects, it may be appropriate to design heat conductors 3 in larger or smaller sectors distributed along the inside of partition wall 1 as well as sectorwise at a mutual distance in the longitudinal direction of the device. This facilitates, inter alia, a direction determination of the medium being measured flowing past. Space 10 may be filled with a gas vented to the atmosphere or filled with a material with low thermal capacity and poor conductivity. This is basically intended to prevent the intrusion of materials which may adversely affect the thermal balance and/or otherwise exert a deleterious effect on the sensor system. Filling of space 10 may also have some favourable mechanical and electrical properties.

Figure 3A:
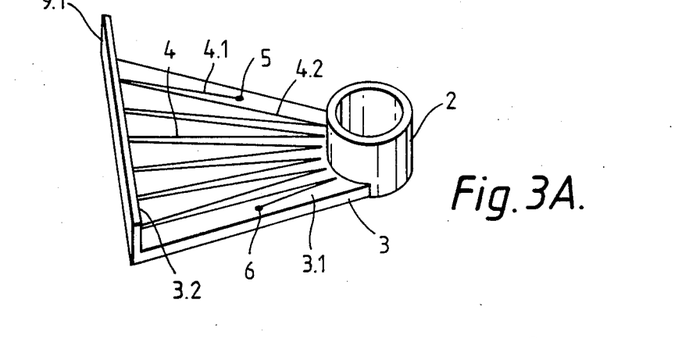
FIGS. 3a, 3b, and 3c show examples of conductor elements equipped with differential temperature sensor elements in the form of a thermopile.
Figure 3B:
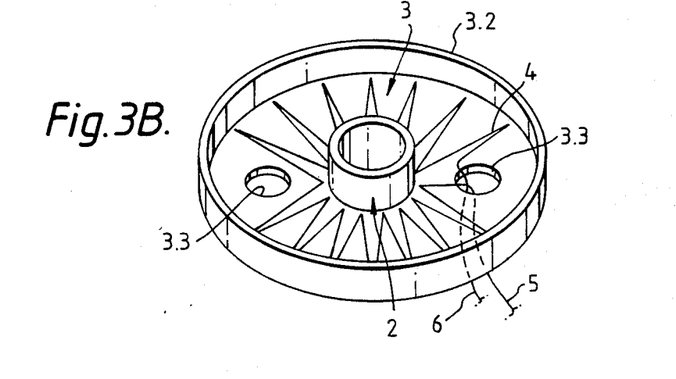

FIGS. 3a and b show examples of embodiments of conductor elements 3.

FIG. 3a shows an example of an embodiment of the conductor element which forms the thermal connection between reference element 2 and contact surface 9.1 which has good thermal contact with partition wall 1 which separates the whole measuring system from the media being measured.

Temperature-sensing element 4 may be composed of a thermopile e.g. in the form of alternately copper 4.1 and constantan 4.2 joined at the ends and with good thermal contact with contact points 3.1 and 3.2 of the conductor element. Via termination points 5 and 6, the voltage generated by the thermal stress is further transmitted to the signal processor.

FIG. 3b shows an example of an embodiment of conductor element 3 in conjunction with a coaxial design of the device where reference element 2 may be arranged at the centre of a disc-shaped conductor element produced from a copper sheet with a contact surface 3.2 which is thermally connected to the inside of tubular partition wall 1.

Figure 3C:
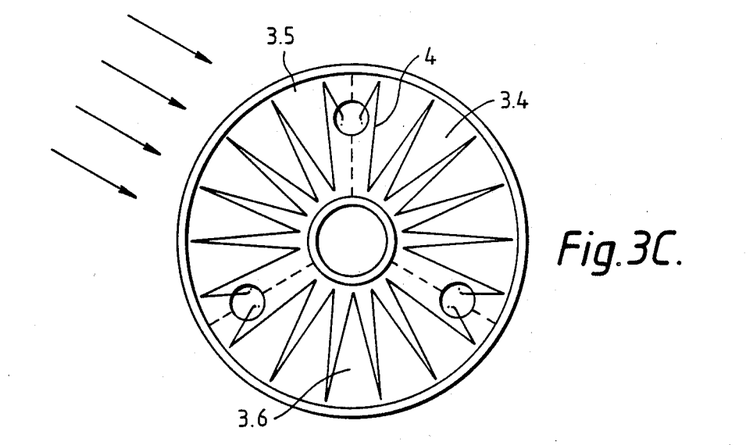

FIG. 3c shows an example of where the conductor element is divided into sectors 3.4, 3.5, and 3.6 for recordation of the flow profile in terms of direction and magnitude.

Figure 4:
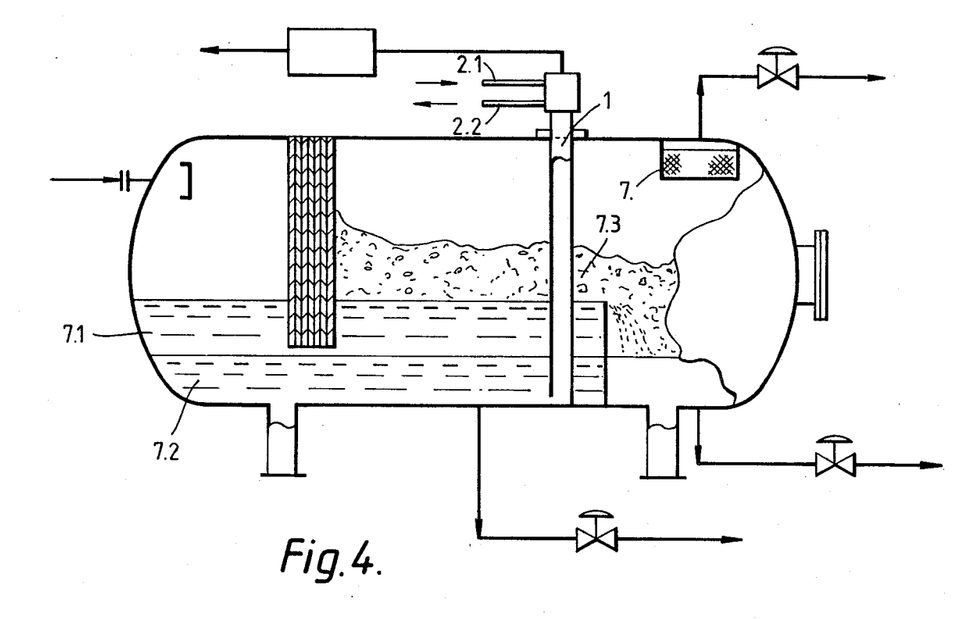
FIG. 4 shows a typical application in a separation process.

FIG. 4 shows an example of application of the device in a separation system for monitoring of the mutual positions of different media being measured which e.g. may be gas 7, oil 7.1, water 7.2, and foam formations 7.3. The different media being measured have different thermodynamic properties and form enclosing contact with surface 1 of the sensor system at discrete sensor areas 9. At these areas 9, with the aid of respective conductor elements, a thermal transport occurs to or from reference element 2 which forms a constant temperature reference with the aid of circulation of a gas or liquid which keeps a constant temperature in the reference element. This occurs via a circulation through inlets and outlets 2.1 and 2.2.

In special situations, it may be appropriate to use the medium being measured or a specific part thereof as a thermal reference, in that this part circulates (flows through) the reference element e.g. in conjunction with a separator where the gas is supplied through the reference element. Alternatively, both oil and water from the separator can be used for establishment of a reference temperature. On practical grounds, it may in some cases be appropriate to use a type of heat converter for avoidance of direct contact between the reference element and medium being measured.

Figures 5, 5A:
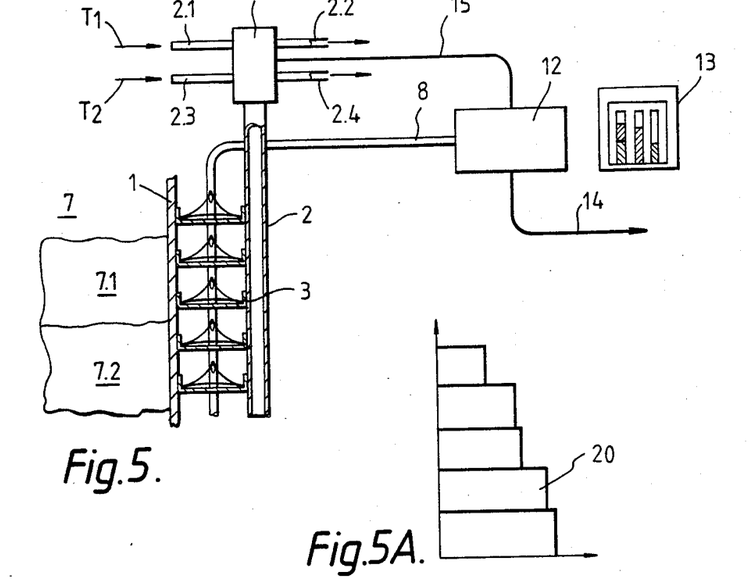
FIG. 5 shows an example of an arrangement showing the signal sequence in relation to the adjacent position of the medium being measured in relation to the device.
FIG. 5a shows a signal presentation of heat transport as a function of the positions of different media being measured.

The separator unit has different inlets and outlets for the different fractions of the medium being measured which, via valves, can be controlled on the basis of information from the sensor system described here. FIG. 5 shows a simplified arrangement of a sensor device where a temperature difference is produced between reference element 2 and partition wall 1 facing the media being measured 7.1 and 7.2. The temperature differential across individual conductor elements 3 is represented in the form of different levels of heat transport. In the example, this is shown from the reference element and to the medium being measured through partition wall 1.

The various potential differences which are measurable across termination points 5 and 6 on respective conductor elements 3 when the system operates according to alternative I are evident from the diagram in FIG. 5a as horizontal columns 20 as a function of the thermal transport between the reference element and basically the medium being measured at the respective positions.

The signals are transmitted via cable 8 to signal processor 12. The position and difference in thermodynamic properties of the media being measured consequently can be visually displayed on display unit 13. Output 14 transfers the information to process control, alarm limit transducers, and any possible other type of signal communication.

Control of switch 11 occurs via connection 15. In the example shown, it is possible to switch between two through-flowing media having different temperatures to establish temperature reference 2.

Inlet 2.1 and outlet 2.2 are for the through-flowing medium with temperature T1 and 2.3 and 2.4 for the through-flowing medium with temperature T2 respectively. In addition to a more static form, alternative I for recordation of heat transport, a sudden change between two different temperatures will also facilitate procurement of information as a function of the time constant of the medium being measured, i.e. a complex picture of both thermal capacity and conductivity, as is evident in alternative II.

Figure 6:
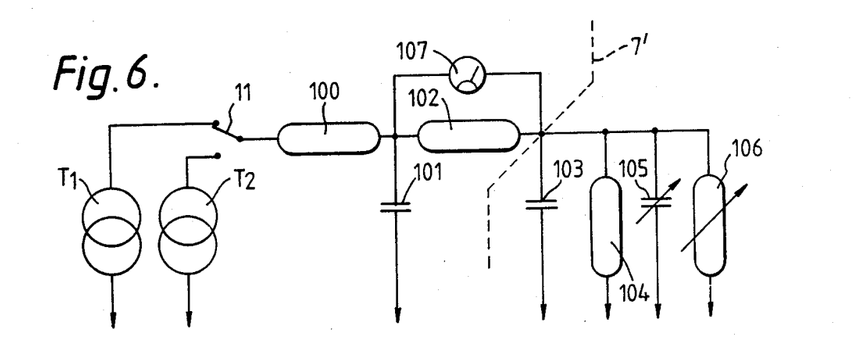
FIG. 6 shows a simplified equivalent diagram of the thermal magnitudes included in the measurement process of the device.

FIG. 6 shows a simple thermal equivalent diagram where T1 and T2 respectively represent two different fluid media with different temperatures. The thermal conductivity to and through reference element 2 is presented as thermal conductivity 100 which it is important to keep as low as possible, with the aid of suitable material selection and design in other respects. A specific thermal capacity is represented by capacity 101. Conductor element 3 is designed to include the thermal conductivity 102, together with thermal stray capacity 103, which is basically represented by partition wall 1', i.e. the external partition wall which separates the medium being measured and sensor system.

Some thermal leakage from sensor area 9 is represented by thermal conductivity 104 and capacity 103. The medium being measured 7 consists of variable thermal capacity 105 and conductivity 106.

In the case here shown, it is possible, with the aid of converter 11, to change between two different temperatures on the reference element which will give a signal sequence which can be read across conductor element 102 with the aid of measuring device 107. The signal sequence follows an exponential curve where the time constant consists of the thermal capacities and conductivities included in the circuit.

Figure 6A:
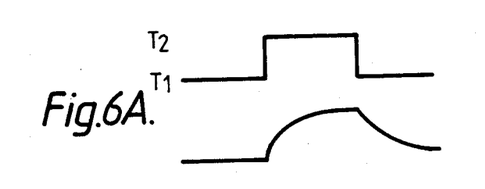
FIG. 6a shows a signal sequence as a result of a change between two temperature levels on the reference element.

A temperature change between T1 and T2 will produce a signal sequence as shown in FIG. 6a. The change on the thermal transport in the conductor elements follows an exponential curve whose time constant is determined by the ratio between the sum of the thermal resistance and thermal capacity respectively. A simple algorithm run in central processing unit 12 basically consists of a comparison of the signal sequence without or with the presence of the medium being measured, so that the net value of the thermodynamic values of the medium being measured makes it possible to read the distribution of the different fractions in relation to the sensor device.

I claim:

1. A device for measuring and monitoring temperature at a plurality of levels in a tank containing at least one stratum of at least one fluid, comprising:

a generally vertically-disposed wall having one side arranged to be in thermal contact, in use, with said at least one stratum of said at least one fluid in said tank, and having an opposite side;

a thermal reference element arranged to be maintained, in use, at a selected reference temperature, said thermal reference element being disposed in spaced relation to said opposite side of said wall so that, in use, said wall stands between said thermal reference element and said at least one stratum of said at least one fluid in said tank, and a space is thereby defined between said wall and said thermal reference element;

a plurality of thermal conductor elements, said thermal conductor elements being arranged as a series of vertically-spaced thermal conductor elements;

each said thermal conductor element having one part thereof spaced from another part thereof by an intermediate part thereof;

each said thermal conductor element having said one part thereof disposed in thermal contact with said opposite side of said wall, at a respective one of said plurality of levels and having said other part thereof disposed in thermal contact with said thermal reference element;

each said thermal conductor element having provided thereon at least one temperature sensor means, each said temperatures sensor means comprising an alternating series of at least two different temperature sensor elements joined to one another in series to provide a plurality of junctions including a first set of junctions disposed nearer said wall and a second set of junctions, disposed nearer said thermal reference element;

a signal processor;

electrical connector means operatively connecting each said temperature sensor means to said signal processor, whereby, in use, electrical signals indicative of temperatures of said opposite side of said wall at said levels are provided to said signal processor for processing; and said signal processor being arranged to process said signals, in use, to produce an indication of temperatures of said at least one fluid in said tank, and, in instances where said at least one fluid includes a plurality of fluids arranged in respective strata having at least one respective interface, an indication of spatial disposition of said at least one interface.

2. The device of claim 1, further including:

converter means arranged for selectively abruptly varying, in use, said selected reference temperature of said thermal reference element, between two substantially different values.

3. The device of claim 1, wherein:

said thermal reference element includes an electric heating element for providing said selected reference temperature.

4. The device of claim 1, wherein:

said thermal reference element is generally vertically extending, and served by means for admitting and causing to flow longitudinally therethrough, in use, a heated fluid, for providing said selected reference temperature; and heat converter for minimizing, in use, gradients in said selected reference temperature longitudinally therealong.

5. The device of claim 1, wherein:

said thermal reference element is an elongated element; and said device further comprises a plurality of temperature sensors operatively associated with said thermal reference element at a plurality of locations spaced therealong, and arranged, in use, to provide signals indicative of variations from said selected reference temperature along said thermal reference element.

6. The device of claim 1, wherein:

said at least one thermal conductor element is constituted by at least three thermal conductor elements extending in different directions in a common plane, for providing respective temperature-dependent signals from sensations made at respectively spaced sites.

7. The device of claim 1, wherein:

said wall is disposed to be peripherally surrounded, in use, by said at least one fluid; and each said thermal conductor element has provided thereon a plurality of said temperature sensor means, said temperature sensor means on each said thermal conductor element being peripherally spaced from one another; and said electrical connector means being so operatively connected to said signal processor as to permit said signal processor to produce an indication, in use, of direction of fluid flow in the tank.

8. The device of claim 7, further including:

converter means arranged for selectively abruptly varying, in use, said selected reference temperature of said thermal reference element, between two substantially different values.

9. The device of claim 7, wherein:

each said thermal conductor element is ring-shaped, having said one part as a radially outer part thereof, and said other part as a radially inner part thereof.

10. The device of claim 9, further including:

converter means arranged for selectively abruptly varying, in use, said selected reference temperature of said thermal reference element, between two substantially different values.

11. The device of claim 9, wherein:

said thermal reference element includes an electric heating element for providing said selected reference temperature.

12. The device of claim 9, wherein:

said wall is tubular; and said thermal reference element is tubular and disposed to be coaxially spacedly surrounded by said wall.

13. The device of claim 12, wherein:

said thermal reference element includes an electric heating element for providing said selected reference temperature.

14. The device of claim 12, wherein:

said thermal reference element is served by means for admitting, in use, a fluid from said one side of said wall into said thermal reference element, for providing said selected reference temperature.

15. The device of claim 14, wherein:

heat converter for minimizing, in use, gradients in said selected reference temperature longitudinally therealong.

16. The device of claim 12, wherein:

said thermal reference element is an elongated element; and said device further comprises a plurality of temperature sensors operatively associated with said thermal reference element at a plurality of locations spaced therealong, and arranged, in use, to provide signals indicative of variations from said selected reference temperature along said thermal reference element.

17. The device of claim 7, wherein:

said wall is tubular; and said thermal reference element is tubular and disposed to be coaxially spacedly surrounded by said wall.

18. The device of claim 17, wherein:

said thermal reference element includes an electric heating element for providing said selected reference temperature.

19. The device of claim 17, wherein:

said thermal reference element is served by means for admitting, in use, a fluid from said one side of said wall into said thermal reference element, for providing said selected reference temperature.

20. The device of claim 19, wherein:

heat converter for minimizing, in use, gradients in said selected reference temperature longitudinally therealong.

21. The device of claim 17, wherein:

said thermal reference element is an elongated element; and said device further comprises a plurality of temperature sensors operatively associated with said thermal reference element at a plurality of locations spaced therealong, and arranged, in use, to provide signals indicative of variations from said selected reference temperature along said thermal reference element.

22. The device of claim 7, wherein:
said thermal reference element includes an electric heating element for providing said selected reference temperature.

23. The device of claim 7, wherein:
said thermal conductor elements are arranged to provide a plurality thereof, spaced from one another, at least of a plurality of vertically spaced levels.

24. The device of claim 23, wherein:
said thermal reference element is tubular and is served by means for admitting, in use, a fluid from said one side of said wall into said thermal reference element, for providing said selected reference temperature.

25. The device of claim 24, wherein:
heat converter for minimizing, in use, gradients in said selected reference temperature longitudinally therealong.

26. The device of claim 7, wherein:
said thermal reference element is tubular and is served by means for admitting, in use, a fluid from said one side of said wall into said thermal reference element, for providing said selected reference temperature.

27. The device of claim 26, wherein:
heat converter for minimizing, in use, gradients in said selected reference temperature longitudinally therealong.

28. The device of claim 1, wherein:
each said thermal conductor element is ring-shaped, having said one part as a radially outer part thereof, and said other part as a radially inner part thereof.

29. The device of claim 28, further including:
converter means arranged for selectively abruptly varying, in use, said selected reference temperature of said thermal reference element, between two substantially different values.

30. The device of claim 28, wherein:
said thermal reference element includes an electric heating element for providing said selected reference temperature.

31. The device of claim 28, wherein:
said wall is tubular and is disposed to be peripherally surrounded, in use, by said at least one fluid; and
said thermal reference element is tubular and disposed to be coaxially spacedly surrounded by said wall.

32. The device of claim 31, wherein:
said thermal reference element includes an electric heating element for providing said selected reference temperature.

33. The device of claim 31, wherein:
said thermal reference element is an elongated element; and
said device further comprises a plurality of temperature sensors operatively associated with said thermal reference element at a plurality of locations spaced therealong, and arranged, in use, to provide signals indicative of variations from said selected reference temperature along said thermal reference element.

34. The device of claim 31, wherein:
said thermal reference element is served by means for admitting, in use, a fluid from said one side of said wall into said thermal reference element, for providing said selected reference temperature.

35. The device of claim 34, wherein:
heat converter for minimizing, in use, gradients in said selected reference temperature longitudinally therealong.

36. The device of claim 1, wherein:
said wall is tubular and is disposed to be peripherally surrounded, in use, by said at least one fluid; and
said thermal reference element is tubular and disposed to be coaxially spacedly surrounded by said wall.

37. The device of claim 36, wherein:
said thermal reference element includes an electric heating element for providing said selected reference temperature.

38. The device of claim 36, wherein:
said thermal reference element is served by means for admitting, in use, a fluid from said one side of said wall into said thermal reference element, for providing said selected reference temperature.

39. The device of claim 38, wherein:
heat converter for minimizing, in use, gradients in said selected reference temperature longitudinally therealong.

40. The device of claim 36, wherein:
said thermal reference element is an elongated element; and
said device further comprises a plurality of temperature sensors operatively associated with said thermal reference element at a plurality of locations spaced therealong, and arranged, in use, to provide signals indicative of variations from said selected reference temperature along said thermal reference element.

41. The device of claim 1, wherein:
said thermal conductor elements are arranged to provide a plurality thereof, spaced from one another, at least of a plurality of vertically spaced levels.

42. The device of claim 41, wherein:
said thermal reference element is tubular and is served by means for admitting, in use, a fluid from said one side of said wall into said thermal reference element, for providing said selected reference temperature.

43. The device of claim 42, wherein:
heat converter for minimizing, in use, gradients in said selected reference temperature longitudinally therealong.

44. The device of claim 1, wherein:
said thermal reference element is tubular and is served by means for admitting, in use, a fluid from said one side of said wall into said thermal reference element, for providing said selected reference temperature.

45. The device of claim 44, wherein:
heat converter for minimizing, in use, gradients in said selected reference temperature longitudinally therealong.

46. A device for measuring and monitoring temperature at at least one level in a tank containing at least one stratum of at least one fluid as an indication of depthwise distribution of fluid in the tank, comprising:
a generally upright wall having one side arranged to be in thermal contact, in use, with said at least one stratum of said at least one fluid in said tank, and having an opposite side;

a thermal reference element arranged to be maintained, in use, at a selected reference temperature, said thermal reference element being disposed in spaced relation to said opposite side of said wall so that, in use, said wall stands between said thermal reference element and said at least one stratum of said at least one fluid in said tank, and a space is thereby defined between said wall and said thermal reference element;

at least one thermal conductor element;

each said thermal conductor element having one part thereof spaced from another part thereof by an intermediate part thereof;

each said thermal conductor element having said one part thereof disposed in thermal contact with said opposite side of said wall, at a respective level and having said other part thereof disposed in thermal contact with said thermal reference element;

each said thermal conductor element having provided thereon at least one temperature sensor means, each said temperatures sensor means comprising an alternating series of at least two different temperature sensor elements joined to one another in series to provide a plurality of junctions including a first set of junctions disposed nearer said wall and a second set of junctions, disposed nearer said thermal reference element;

a signal processor;

electrical connector means operatively connecting each said temperature sensor means to said signal processor, whereby, in use, electrical signals indicative of temperatures of said opposite side of said wall at each said level are provided to said signal processor for processing; and said signal processor being arranged to process said signals, in use, to produce an indication of temperatures of said at least one fluid in said tank.

47. The device of claim 46, wherein:

said wall is disposed to be peripherally surrounded, in use, by said at least one fluid; and each said thermal conductor element has provided thereon a plurality of said temperature sensor means, said temperature sensor means on each said thermal conductor element being peripherally spaced from one another; and said electrical connector means being so operatively connected to said signal processor as to permit said signal processor to produce an indication, in use, of direction of fluid flow in the tank.

* * * * *